(12) United States Patent
Junker

(10) Patent No.: US 6,990,967 B2
(45) Date of Patent: Jan. 31, 2006

(54) POTENTIOMETER DEVICE FOR DETERMINATION OF VALVE POSITIONS

(75) Inventor: Frank Junker, Dusseldorf (DE)

(73) Assignee: Pierburg GmbH, Neuss (DE)

( * ) Notice: Subject to any disclaimer, the term of this patent is extended or adjusted under 35 U.S.C. 154(b) by 45 days.

(21) Appl. No.: 10/925,995

(22) Filed: Aug. 26, 2004

(65) Prior Publication Data

US 2005/0046425 A1 Mar. 3, 2005

(30) Foreign Application Priority Data

Aug. 28, 2003 (DE) .......................................... 103 40 034

(51) Int. Cl.
*F02B 47/08* (2006.01)

(52) U.S. Cl. .............................. 123/568.21; 123/568.16
(58) Field of Classification Search ............ 123/568.21, 123/568.16, 350, 399; 701/101, 108, 115
See application file for complete search history.

(56) References Cited

U.S. PATENT DOCUMENTS

| | | | |
|---|---|---|---|
| 4,126,111 A | | 11/1978 | Hafner et al. |
| 4,142,493 A | * | 3/1979 | Schira et al. ........... 123/568.21 |
| 4,432,331 A | * | 2/1984 | Yasuhara ............... 123/568.16 |
| 5,528,754 A | | 6/1996 | Okamoto |
| 5,617,337 A | * | 4/1997 | Eidler et al. ................. 702/104 |
| 6,065,448 A | * | 5/2000 | Hatton et al. ............... 123/396 |
| 6,729,315 B2 | * | 5/2004 | Onodera et al. ........ 123/568.21 |

FOREIGN PATENT DOCUMENTS

| | | |
|---|---|---|
| DE | 3714697 A1 | 11/1988 |
| DE | 4020106 C2 | 12/1999 |
| DE | 19833413 A1 | 2/2000 |
| DE | 10159258 A1 | 6/2003 |
| WO | WO9200504 A1 | 1/1992 |

OTHER PUBLICATIONS

German Search Report, dated Mar. 3, 2004.

* cited by examiner

*Primary Examiner*—Mahmoud Gimie
(74) *Attorney, Agent, or Firm*—Griffin & Szipl, P.C.

(57) ABSTRACT

A potentiometer device, for detecting valve positions, wherein a voltage signal $U_s$ is sendable to a control unit having an A/D converter, including a carrier element on which at least one slider track, having a slider element in contact therewith, is disposed; wherein the slider track switches between supply voltage $U_v$ of the control unit and ground, and the slider element is connected with the control unit with a protection resistance over an output, wherein the control unit includes a resistance for detecting a cable disconnect, which is a pull-down resistance between voltage signal $U_s$ and ground, or a pull-up resistance between supply voltage $U_v$ and voltage signal $U_s$, wherein a resistance is provided at output, that is, in a first embodiment, a pull-up resistance between supply voltage $U_v$ and voltage signal $U_s$, and, in a second embodiment, a pull-down resistance between voltage signal $U_s$ and ground.

12 Claims, 3 Drawing Sheets

POTENTIOMETER DEVICE FOR DETERMINATION OF VALVE POSITIONS

This application claims priority from German Patent Application No. 10340034.6, filed 28 Aug. 2003, the entire disclosure of which is incorporated herein by reference.

FIELD OF THE INVENTION

The present invention relates to a potentiometer device for the determination of valve positions, wherein a voltage signal $U_s$ is sendable to a control unit, which has an A/D converter, by using a carrier element on which at least one slider track is provided with a slider element in contact therewith, wherein the slider track switches between a supply voltage $U_v$ of the control unit and ground. In accordance with a potentiometer device of the present invention, the slider element is connected to the control unit by a protective resistor over one output, and the control unit includes a resistor for detecting a cable disconnect, wherein the resistance of the resistor for detecting a cable disconnect is either a pull-down resistance disposed between the voltage signal $U_s$ and ground, or a pull-up resistance disposed between the supply voltage $U_v$ and the voltage signal $U_s$.

BACKGROUND OF THE INVENTION

Potentiometer devices are sufficiently well known and are implemented for position determination of an element, such as, for example with throttles, exhaust gas feedback valves, etc. Circuit failure detection for short circuits and cable disconnections using a potentiometer is known, as demonstrated by the IC engine throttle valve failure detector described in DE 4020106 C2. In the device taught by this reference, a pull-down resistance or a pull-up resistance is provided in a valuation circuit of a control unit, which provides a voltage signal to an A/D converter as a fail signal. The fail signal is either an implausibly low potential or an implausibly high signal. A potentiometer of this type has the disadvantage in that, even with high so-called "noise resistance" occurring between the sliding track and the sliding element, such as may be due to impurities or friction polymers, for example, an erroneous failure signal may still be produced.

In particular, the danger of high noise resistance arises in the case of exhaust gas feedback valves that can, over long periods of time, be used in an offset region, and correspondingly are locked continuously over a relatively long period of time. Consequently, the sliding element is not moved over the sliding track for this extended period. This inactivity often leads to an undesirable erroneous fail signal due to operation of the valve in the offset region. An erroneous fail signal is one that is not relevant to emission or diagnosis operations related to the exhaust gas feedback valve. One solution to the problem of erroneous fail signals is described in the DE 4020106 C2 reference, wherein noise peaks in the output signal of the potentiometer are suppressed as much as possible. However, this solution is cost intensive to implement because differing potential states for the control unit are required.

One object of the present invention is therefore to provide a potentiometer device that simply avoids an erroneous output signal due to noise resistance in the offset range.

Another object of the present invention is to provide a potentiometer device that is inexpensive to implement and avoids erroneous output signals while operating in the offset range.

Another object of the present invention is to provide a potentiometer device that avoids erroneous output signals while operating in the offset range and that can be connected to a control unit that has a single potential state rather than requiring connection to a control unit having differing potential states.

Another object of the present invention is to overcome the disadvantages of the prior art potentiometer devices while retaining the advantages of these devices.

BRIEF SUMMARY OF THE INVENTION

These objectives of the present invention are solved by providing an output resistance on the output that, in a first embodiment, provides a pull-up resistance between the supply voltage $U_v$ and the voltage signal $U_s$, and that, in a second embodiment, provides a pull-down resistance between the voltage signal $U_s$ and ground. In this particularly simple way, a sufficiently plausible voltage signal, with intact connections, is always maintained at the input of the control device; therefore, erroneous failing voltage signals in the offset region are avoided.

Preferably, the relationship between the output resistance and the second resistance for detecting a cable disconnect in the first embodiment, reside in the range from 3:1 to 8:1, and, in the second embodiment, in the range from 1:8 to 1:3.

It is therefore possible to dispose the output resistance directly on the carrier element. Another possibility, that is particularly suited to simply upgrading, resides in disposing the output resistance in a plug element that is insertable into the output of the carrier element. The actual output of the potentiometer device, by which it is possible by means of a cable to make a connection to the control unit, lies on the plug element. The plug element can therefore also naturally be pluggable to an input of the potentiometer device for delivery of the supply potential $U_v$.

Thus, in accordance with the above objectives, the present invention provides a potentiometer device, for detecting valve positions, connected to send a voltage signal $U_s$ to a control unit, wherein the potentiometer device includes: (a) a carrier element; and (b) at least one slider track disposed on the carrier element, and a slide element in contact with the slider track, wherein the slider track switches between a supply voltage $U_v$ of the control unit and a ground, and the slider element is connected with the control unit by a protective resistance over an output; wherein the control unit comprises: (a) an A/D converter; and (b) a first resistance, for detecting a cable disconnect, connected to the A/D converter, wherein the first resistance is selected from the group consisting of a pull-down resistance connected between voltage signal $U_s$ and ground, and a pull-up resistance connected between supply voltage $U_v$ and voltage signal $U_s$; wherein the potentiometer device further comprises (c) a second resistance connected to the output, wherein when the first resistance is selected as the pull-down resistance then the second resistance is a pull-up resistance connected between the supply voltage $U_v$ and the voltage signal $U_s$, and when the first resistance is selected as the pull-up resistance then the second resistance is a pull-down resistance connected between the voltage signal $U_s$ and the ground.

In accordance with a second embodiment of the present invention, the first embodiment is modified so that when the first resistance is the pull-down resistance then a ratio relationship between the second resistance and the first resistance ranges from 3:1 to 8:1; and wherein when the first resistance is the pull-up resistance then the ratio relationship between the second resistance and the first resistance ranges from 1:8 to 1:3. In accordance with a third embodiment and a fourth embodiment of the present invention, the first embodiment and the second embodiment are respectively modified so that the second resistance is disposed on a carrier element of the potentiometer device. In accordance with a fifth embodiment and a sixth embodiment of the present invention, the first embodiment and the second embodiment are modified respectively so that the second resistance is disposed in a plug element that is plugged onto the output of the carrier element.

In accordance with a seventh embodiment of the present invention, an internal combustion machine is provided that comprises an exhaust gas feedback assembly, wherein the assembly includes: (a) an airstream member connected to an internal combustion machine assembly so exhaust gas from the machine assembly is introduced into the airstream member; (b) an exhaust gas feedback valve connected to the airstream member, wherein the exhaust gas feedback valve is associated with a potentiometer device disposed to determine a position of the exhaust gas feedback valve and to generate a position signal; and (c) a control unit connected to receive the position signal generated by the potentiometer device and connected to send a control signal to the exhaust gas feedback valve, wherein the potentiometer device includes: (i) a carrier element; and (ii) at least one slider track disposed on the carrier element, a slider element in contact with the slider track, wherein the slider track switches between a supply voltage $U_v$ of the control unit and a ground, and the slider element is connected with the control unit by a protective resistance over an output; wherein the control unit includes: (i) an A/D converter; and (ii) a first resistance, for detecting a cable disconnect, connected to the A/D converter, wherein the first resistance is selected from the group consisting of a pull-down resistance connected between voltage signal $U_s$ and ground, and a pull-up resistance connected between supply voltage $U_v$ and voltage signal $U_s$; wherein the potentiometer device further comprises a second resistance connected to the output, wherein when the first resistance is selected as the pull-down resistance, then the second resistance is a pull-up resistance connected between the supply voltage $U_v$ and the voltage signal $U_s$, and when the first resistance is selected as the pull-up resistance, then the second resistance is a pull-down resistance connected between the voltage signal $U_s$ and the ground.

In accordance with an eighth embodiment of the present invention, the seventh embodiment is modified so that when the first resistance is the pull-down resistance then a ratio relationship between the second resistance and the first resistance ranges from 3:1 to 8:1; and wherein when the first resistance is the pull-up resistance then the ratio relationship between the second resistance and the first resistance ranges from 1:8 to 1:3. In accordance with a ninth embodiment and a tenth embodiment of the present invention, the seventh embodiment and the eighth embodiment are respectively modified so that the second resistance is disposed on a carrier element of the potentiometer device. In accordance with an eleventh embodiment and a twelfth embodiment of the present invention, the seventh embodiment and the eighth embodiment are modified so that the second resistance is disposed in a plug element that is plugged onto the output of the carrier element.

Further objects, features and advantages of the present invention will become apparent from the Detailed Description of the Illustrative Embodiments, which follows, when considered together with the attached drawings.

BRIEF DESCRIPTION OF THE DRAWINGS

Illustrative embodiments are shown in the drawings and will be described as follows.

DETAILED DESCRIPTION OF THE ILLUSTRATIVE EMBODIMENTS

Figure 1:
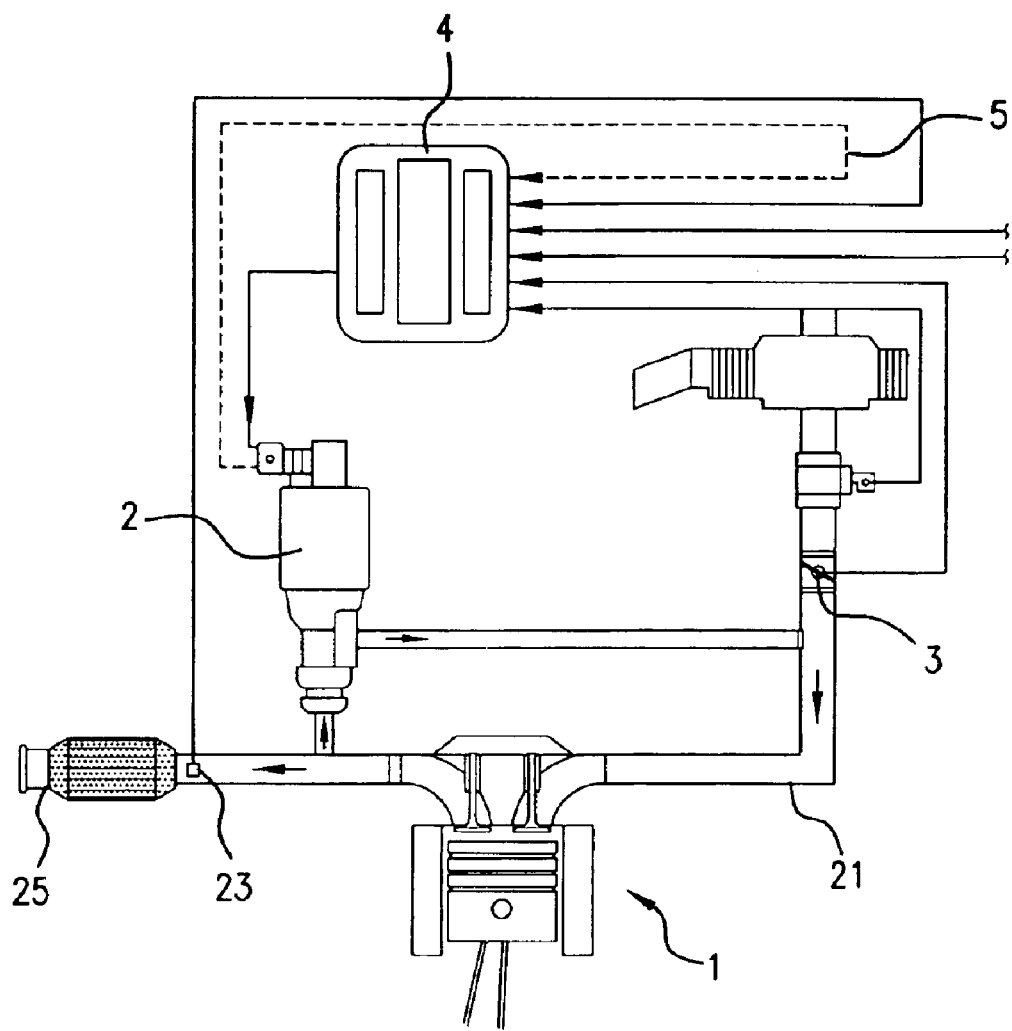
FIG. 1 schematically shows an exhaust gas feedback assembly of an internal combustion machine implementing the process of controlling and signaling regarding the position of an exhaust gas feedback valve.

FIG. 1 schematically shows an exhaust gas feedback assembly in an "Otto" internal combustion machine. Otto internal combustion machines, such as the otto internal combustion engine disclosed in U.S. Pat. No. 4,126,111 and incorporated herein by reference, are generally known. However, in accordance with the present invention, the exhaust gas produced by an internal combustion machine assembly 1 can be introduced into the airstream member 21 of an exhaust gas feedback assembly on the downstream side of a throttle valve 3 by using an exhaust gas feedback valve 2. A control unit or device 4 is connected to the exhaust gas feedback valve 2 and operates to control operation of the exhaust gas feedback valve 2. The control unit 4 is connected to receive position signal input from potentiometer device 6 via a position signal connection 5 in order to control exhaust gas feedback over the exhaust gas feedback valve 2. The potentiometer device 6 is either incorporated with, or attached to, the exhaust gas feedback valve 2 so as to determine the position of the valve 2 and to generate the position signal that is input into the control unit 4.

The control unit 4 can also be connected to receive input signals from other sensors other than the potentiometer device 6. For example, the exhaust gas feedback assembly can be equipped with an exhaust gas sensor 23 located within the airstream member 21 near exhaust member 25 so as to measure one or more predetermined exhaust gas parameters. Sensor 23 operates to generate an exhaust gas measurement signal and is connected to the control unit 4 so as to provide signal input for the control unit 4. In addition, the throttle valve 3 can be provided with a sensor for detecting the position of the throttle valve and for generating a throttle position signal. As evident from FIG. 1, the sensor for detecting the position of the throttle valve is connected to send the throttle valve position signal as input to the control unit 4.

Figure 2:
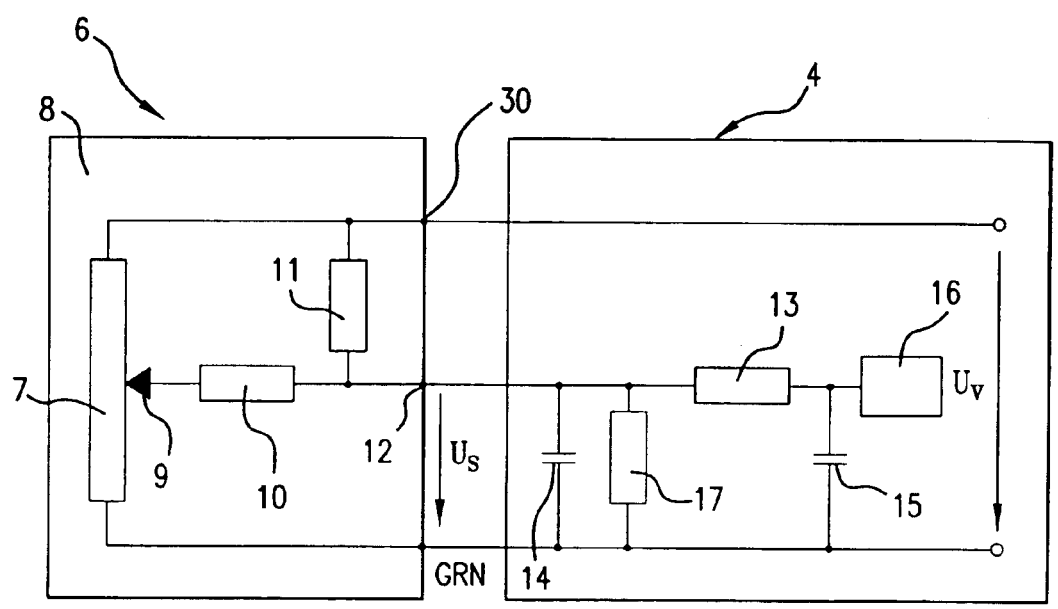
FIG. 2 shows a block circuit diagram of a potentiometer device, in accordance with the present invention, connected with a control unit.

FIG. 2 shows a block circuit diagram of a potentiometer device 6 in accordance with the present invention. Furthermore, FIG. 2 shows a portion of the circuitry of the control device 4. The potentiometer device 6 is provided with at least one slide track 7, which is switched in a known manner on a carrier element 8 between a supply potential $U_v$ of the control unit 4 and ground GND. A slider element 9 engages the sliding track 7. The slider element 9 is connected with the control unit 4 by the protective resistance 10 over output 12. The potentiometer device 6 also includes a pull-up resistance 11 that is switched between the supply potential $U_v$ and the voltage signal $U_s$. The voltage signal $U_s$ is, in a known manner, fed to the control unit 4 over output 12, wherein the signal is then, in a known manner, smoothed out by a resistance 13 and capacitors 14, 15 before an A/D converter 16 digitalizes the signal.

In order to detect a cable disconnection between the sliding element 9 and the control unit 4, such as could occur at output 12 or connection terminal 30, a pull-down resistance 17 is provided in a known manner. In the event there is a cable disconnect between the potentiometer device 6 and the control unit 4, then voltage signal $U_s$ would no longer be connected to the control unit 4. Under these circumstances, the remaining rest voltages, which are maintained by capacitors 14, 15, are switched over the pull-down resistance 17 against ground.

In the case when there is a high noise resistance in the slider element 9, caused by a longer operation of the exhaust gas feedback valve 2 in the offset region, an effective voltage signal $U_s$ can be fed to the control unit 4 over a pull-up resistance 11. In this way, with a pull-up resistance 11 of 400 kΩ and a pull-down resistance 17 of 100 kΩ, a voltage signal of about 1V is fed to the A/D converter, which fulfills the requirements for running in the offset region. In other words, an erroneous fail signal is avoided because a sufficient effective voltage signal $U_s$ is maintained and fed to the A/D converter even though the exhaust gas feedback valve 2 is operating for a long period of time in the offset region thereby causing the sliding element to be subject to high noise resistance and/or the circuit to micro-disconnects.

While the ratio relationship between the pull-up resistance 11 and the pull-down resistance 17 is 4:1 in the illustrative example described above, in accordance with the present invention, the ratio relationship between pull-up resistance 11 and pull-down resistance 17 can range from 3:1 to 8:1.

Figure 3:
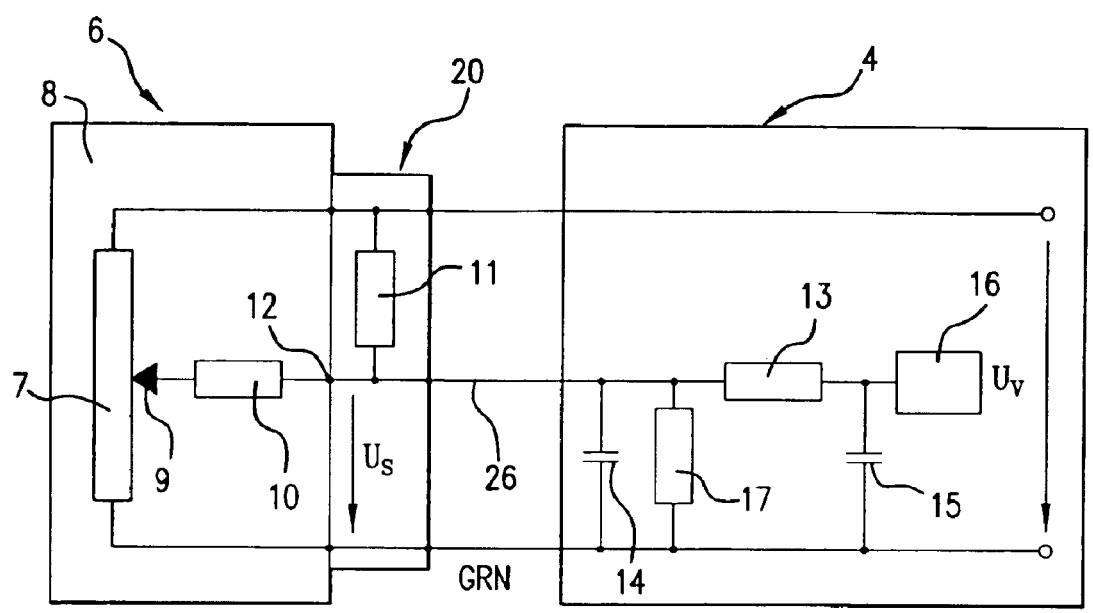
FIG. 3 shows a schematic block circuit diagram of a potentiometer device connected to a control unit in accordance with another embodiment of the present invention.

In accordance with another embodiment of the present invention, as shown in FIG. 3, instead of connecting the resistance 11 directly to the carrier element 8, it is also possible to dispose resistance 11 on a plug element 20, which can be plugged onto an output 12 of the carrier element 8 or elsewhere on the carrier element. After plugging on the plug element 20 so as to connect the resistance 11 to the remainder of the circuitry for the potentiometer device 6, the plug element 20 is also connected to the input 26 of the control unit 4.

In yet another embodiment in accordance with the present invention, resistance 17 is embodied as a pull-up resistance and resistance 11 is embodied as a pull-down resistance. In other words, the functionality of this embodiment is substantially the same as the previous embodiment wherein the resistance 17 is embodied as a pull-down resistance and, correspondingly, the resistance 11 is embodied as a pull-up resistance. In accordance with the present invention, the ratio relationship between pull-down resistance 11 and pull-up resistance 17 can range from 1:3 to 1:8.

Generally speaking, in accordance with the present invention, resistance 11 is an "output" resistance and resistance 17 is a "resistance for detecting a cable disconnect." Therefore, it is not critical that output resistance 11 be a pull-up resistance or a pull-down resistance so long as when resistance 11 is a pull-up resistance, then, correspondingly, the cable disconnect detecting resistance 17 is a pull-down resistance. Likewise, when output resistance 11 is a pull-down resistance, then, correspondingly, the cable disconnect detecting resistance 17 must be a pull-up resistance.

While the present invention has been described with reference to certain illustrative embodiments, one of ordinary skill in the art will recognize that additions, deletions, substitutions, modifications and improvements can be made while remaining within the spirit and scope of the present invention as defined by the appended claims.

What is claimed is:

1. A potentiometer device, for detecting valve positions, connected to send a voltage signal $U_s$ to a control unit, the potentiometer device comprising:

a carrier element; and at least one slider disposed on the carrier element, and a slider element in contact with the slider track, wherein the slider track switches between a supply voltage $U_v$ of the control unit and a ground, and the slider element is connected with the control unit by a protective resistance over an output;

wherein the control unit comprises:

an A/D converter; and a first resistance, for detecting a cable disconnect, connected to the A/D converter, wherein the first resistance is selected from the group consisting of a pull-down resistance connected between voltage signal $U_s$ and ground, and a pull-up resistance connected between supply voltage $U_v$ and voltage signal $U_s$;

wherein the potentiometer device further comprises a second resistance connected to the output, wherein when the first resistance is selected as the pull-down resistance then the second resistance is a pull-up resistance connected between the supply voltage $U_v$ and the voltage signal $U_s$, and when the first resistance is selected as the pull-up resistance then the second resistance is a pull-down resistance connected between the voltage signal $U_s$ and the ground.

2. A potentiometer device according to claim 1, wherein when the first resistance is the pull-down resistance then a ratio between the second resistance and the first resistance ranges from 3:1 to 8:1; and wherein when the first resistance is the pull-up resistance then a ratio between the second resistance and the first resistance ranges from 1:8 to 1:3.

3. A potentiometer device according to claim 1, wherein the second resistance is disposed on a carrier element of the potentiometer device.

4. A potentiometer device according to claim 2, wherein the second resistance is disposed on a carrier element of the potentiometer device.

5. A potentiometer device according to claim 1, wherein the second resistance is disposed in a plug element that is plugged onto the output of the carrier element.

6. A potentiometer device according to claim 2, wherein the second resistance is disposed in a plug element that is plugged onto the output of the carrier element.

7. An internal combustion machine comprising an exhaust gas feedback assembly, the feedback assembly comprising:

(a) an airstream member connected to an internal combustion machine assembly so exhaust gas from the machine assembly is introduced into the airstream member;

(b) an exhaust gas feedback valve connected to the airstream member, wherein the exhaust gas feedback valve is associated with a potentiometer device disposed to determine a position of the exhaust gas feedback valve and to generate a position signal; and (c) a control unit connected to receive the position signal generated by the potentiometer device and connected to send a control signal to the exhaust gas feedback valve; and (d) wherein the potentiometer device comprises:

i. a carrier element; and ii. at least one slider track disposed on the carrier element, and a slider element in contact with the slider track, wherein the slider track switches between a supply voltage $U_v$ of the control unit and a ground, and the slider element is connected with the control unit by a protective resistance over an output;

wherein the control unit comprises:
  i. an A/D converter; and
  ii. a first resistance, for detecting a cable disconnect, connected to the A/D converter, wherein the first resistance is selected from the group consisting of a pull-down resistance connected between voltage signal $U_s$ and ground, and a pull-up resistance connected between supply voltage $U_v$ and voltage signal $U_s$;

wherein the potentiometer device further comprises a second resistance connected to the output, wherein when the first resistance is selected as the pull-down resistance then the second resistance is a pull-up resistance connected between the supply voltage $U_v$ and the voltage signal $U_s$, and when the first resistance is selected as the pull-up resistance then the second resistance is a pull-down resistance connected between the voltage signal $U_s$ and the ground.

8. An internal combustion machine according to claim 7, wherein when the first resistance is the pull-down resistance then a ratio between the second resistance and the first resistance ranges from 3:1 to 8:1; and wherein when the first resistance is the pull-up resistance then a ratio between the second resistance and the first resistance ranges from 1:8 to 1:3.

9. An internal combustion machine according to claim 7, wherein the second resistance is disposed on a carrier element of the potentiometer device.

10. A potentiometer device according to claim 8, wherein the second resistance is disposed on a carrier element of the potentiometer device.

11. A potentiometer device according to claim 7, wherein the second resistance is disposed in a plug element that is plugged onto the output of the carrier element.

12. A potentiometer device according to claim 8, wherein the second resistance is disposed in a plug element that is plugged onto the output of the carrier element.

* * * * *